United States Patent

[11] 3,631,588

| [72] | Inventors | Dan A. Barozzi;<br>Valentin Calin, both of Brasov; Peter<br>Zsigmond, Prejmer-Brasov, all of Romania |
|---|---|---|
| [21] | Appl. No. | 28,968 |
| [22] | Filed | Apr. 15, 1970 |
| [45] | Patented | Jan. 4, 1972 |
| [73] | Assignee | Fabrica De Radiatoare Si Cabluri<br>Brasov, Brasov-Soseaua Crestianului,<br>Romania |
| [32] | Priority | Sept. 4, 1969 |
| [33] | | Romania |
| [31] | | 60953 |

[54] METHOD OF SOLDERING THE COOLING BODY OF AUTOMOBILE RADIATORS
6 Claims, No Drawings

[52] U.S. Cl. ........................................ 29/488, 29/495, 29/498, 148/25, 148/29
[51] Int. Cl. ........................................ B23k 1/20, B23k 31/02
[50] Field of Search ............................ 148/25, 29; 29/488, 495, 498

[56] References Cited

UNITED STATES PATENTS

| 735,941 | 8/1903 | Burwell | 148/25 |
|---|---|---|---|
| 2,575,413 | 11/1951 | Franklin | 148/25 |
| 3,242,565 | 3/1966 | North et al. | 29/488 X |
| 3,451,114 | 6/1969 | Werneke | 29/495 X |
| 3,456,331 | 7/1969 | Holden | 29/498 X |
| 3,467,556 | 9/1969 | Stayner | 148/25 |
| 3,495,323 | 2/1970 | Fournier | 29/498 X |

FOREIGN PATENTS

| 194,729 | 5/1924 | Great Britain | 148/25 |

*Primary Examiner*—John F. Campbell
*Assistant Examiner*—Ronald J. Shore
*Attorney*—Karl F. Ross

ABSTRACT: The invention is a new method for the manufacture of motor car radiators, regarding the soldering operation of the cooling body, consisting of cooling pipes and fins of aluminum, copper, brass or steel with an easily melting alloy.

METHOD OF SOLDERING THE COOLING BODY OF AUTOMOBILE RADIATORS

The method utilizes a thermopickling bath in which, by immersion of the cooling assembly for a given time and at a given temperature, are carried out simultaneously the pickling operation of the surfaces and the melting of the easily melting alloy. In order to solder the cooling body, with aluminum fins, a previous chemical operation is performed, which consists in the removal of the oxide layer and the insulation of the surface so obtained. The aluminum treated in this way can remain receptive to soldering by this method for 90 days. The water pipes are covered with special easily melting alloys, apt to adhere to the aluminum surface.

This invention relates to a method of soldering/brazing the cooling body of car radiators.

Methods for soldering the cooling body of car radiators are known, by which the assembly, mounted upon cooling pipes covered by an easily melting alloy, is introduced into a furnace heated by electricity or by liquid or gaseous fuel, the joining of the fins with the pipes being realized by melting the easily melting alloy.

The known methods have disadvantages due to the fact, that the heating of the joint to melt the easily melting alloy cannot be uniformly realized, so that incomplete joining zones are created, a fact which affects much the heat transfer of the cooling body in operation.

Utilization of picklers, mostly based on zinc/chloride solutions leads to corrosion of the furnaces, influences negatively the quality of soldering and causes the degradation of the surfaces which have to be joined in the following operation. The fact makes it necessary to continue, after the joining process, a treatment with intricate neutralization; even then the remaining picklers cannot be completely eliminated from the surface of the joint and continue their corrosive action, so that the life of the radiator is shortened.

Manufacturing methods for automobile radiators are also known, according to which the cooling fins are made out of aluminum. To join the aluminum fins with the cooling pipes covered by an easily melting alloy, an electrochemical plating or a mechanical one of the surfaces of the aluminum joining parts is necessary with a metallic layer receptive to soldering with easily melting alloys, as direct soldering of aluminum is difficult due to the superficial layer of aluminum oxide, which cannot be eliminated without many intricate operations, this constituting the main disadvantage of these methods. Another disadvantage is the fact that the soldering operation is performed in furnaces with a neutral atmosphere in the presence of corrosive picklers, the elimination of which from the contact surfaces is difficult.

The method according to the invention eliminates these drawbacks by using for the joining operation a hot pickling bath consisting of 98 percent mineral oil and 2 percent of a pickling mixture based upon ammonium bromide, ammonia and glycerine into which the cooling body assembly is introduced, having been formed in a known manner out of copper, brass, steel or aluminum fins mounted upon the cooling pipes, the aluminum fins being previously pickled and covered with a protective film, and the cooling pipes being covered by one or two easily melting alloy layers and also with a protective film, a hot pickling bath, in which the joint is maintained during 5 to 10 minutes at a temperature of 260° to 300° C., in which time pickling and melting of the easily melting alloy and soldering is performed, and then the soldered joint is cooled in a horizontal position by means of an air jet and washed with an adequate conventional solvent.

SPECIFIC EXAMPLES

1. According to the invention, in order to solder the cooling fins made out of aluminum upon the cooling pipes, the removal of the superficial oxide film which covers the surface of the fins. Therefore, the aluminum fins is necessary are pickled by immersion during 1 to 5 minutes at a temperature of 20° to 30° C. into a bath consisting of a pickling solution having the following percent composition: 40 percent technical nitric acid, density 1.40; 2 percent hydrofluoric acid (concentration 38 percent) and 58 percent water. The fins are then washed in flowing water during 1 minute, after which, for preserving the pickling, the parts are plunged during 30 seconds at 30° to 35° C. into a bath consisting of a protective solution made out of 5 to 15 percent stearin, 2 percent ammonium bromide and 83 to 93 percent technical alcohol.

As a result, a protective film is formed, upon the surfaces of the aluminum fins having a thickness of 2 to 4µ, avoiding the reoxidation of the pickled fins.

The cooling pipes are heat covered by usual methods with an easily melting alloy with a minimum thickness between 0.04 and 0.06 mm., having the following chemical composition: 46 percent tin, 15 percent zinc, 15 percent cadmium, 24 percent lead, or with two layers of brazing alloys in succession, the first layer being formed by an usual alloy having the following composition: 40 percent tin and 60 percent lead, and the second layer being formed by an easily melting alloy with the following composition: 51 percent tin, 16.2 percent zinc, 16.2 percent cadmium, 16.6 percent lead. The cooling pipes are then protected by immersion into a protective solution based upon the stearin, with the above-indicated composition.

The aluminum fins, treated in the described manner, are mounted upon the so-prepared pipes, and then the whole assembly of the cooling body is introduced for soldering into a hot pickling bath containing 98 percent mineral oil and 2 percent pickling mixture with the composition: 60 percent stearin, 20 percent ammonium bromide, 10 percent glycerine and 10 percent concentrated ammonia solution. The utilized mineral oil for the above purpose must have the following characteristics: 0.910 relative density at 20° C., maximum unio color −5; ignition point Marcuson 265° C.; freezing point max. −4° C.; cinematic viscosity in C.S.T. 228 to 224 at 50° C. and 26 at 100° C.; conventional viscosity at 50° C., 30° to 32° E. and at 100° C. =3.6° E.; viscosity index 85; water contents—none; ash contents: max. 0.01 percent; mineral acidity and alcalinity—none; coke Conradson: 1.4 percent.

The cooling body is maintained for a period of 5 to 10 minutes in this environment according to the size and the type of construction, at a temperature between 260° and 280° C., in which time the melting of the alloy and soldering of the aluminum fins upon the cooling pipes are performed.

After being taken out of the hot pickling bath, the cooling body is cooled in a horizontal position by an air jet, obtaining the cooling and solidification of the soldering alloy at the joints, as well as the evacuation and the recovery of the hot pickling liquid.

The complete cleaning of the cooling body is obtained by immersing it into a bath containing an adequate common solvent.

The soldered cooling body is then passed to the mounting operations, according to the technological flux.

2. Cooling fins out of copper, brass or steel are mounted upon cooling pipes, covered by one layer of soldering alloy, having the composition of 40 percent tin and 60 percent lead, indicated also in the first example, and are protected by immersion into a protective solution formed by 20 percent stearin, 40 percent paraffin oil, 18 percent paraffin 2 percent ammonium bromide and 20 percent gas-oil.

The so-assembled cooling body is introduced for soldering into a hot pickling bath with the composition as indicated in example 1. The cooling body is kept within this medium 2 to 10 minutes at a temperature of 260° to 300° C., during which time pickling of the surfaces takes place, the easily melting alloy melts on the cooling pipes and the respective fins are soldered. After being taken out of the not pickling bath, the soldered assembly is treated as described in example 1.

By applying the method according to the present invention, soldering of unplated aluminum fins onto the cooling pipes is realized, neutral-atmosphere furnaces, which formerly used to be utilized, being expensive and difficult to maintain, are replaced by utilizing instead baths of hot pickling liquid, assuring simultaneously the pickling of the surfaces to be soldered and uniform heating until melting temperature of the alloy put upon the cooling pipes, without the need of corrosive picklers for soldering, which are difficult to eliminate from the surfaces of the cooling body.

What we claim is:

1. A method of soldering the cooling body of car radiators wherein, in order to eliminate the incomplete soldering zones or points, it utilizes for soldering a thermopickling bath, containing 98 percent mineral oil and 2 percent of a pickling mixture which consists essentially of ammonium bromide, ammonia and glycerine into which the cooling body assembly is introduced, the body being formed of copper, brass, steel or aluminum fins, mounted upon the cooling pipes, the aluminum fins being pickled and covered first by a protective film, and the cooling pipes being covered by one or two layers of easily melting soldering alloy, as well as by a protective film, the so-prepared cooling assembly being maintained for 5 to 10 minutes in the said thermopickling bath, heated at 260° to 300° C., in order to pickle, to melt the easily melting alloy and to solder the fins to the cooling pipes, after which the soldered assembly is cooled in a horizontal position by means of an air jet and washed with a solvent.

2. Method according to claim 1, where in the pickling mixture of the thermopickling bath composition consists of 60 percent stearin, 20 percent ammonium bromide, 10 percent glycerine and 10 percent concentrated ammonia solution.

3. Method according to claim 1, wherein, for pickling the aluminum fins, a bath consisting of 40 percent technical nitric acid density 1.40; 2 percent hydrofluoric acid in 38 percent concentration and the rest water, in which pickling is performed at 20° to 30° C. during 1 to 5 minutes.

4. Method according to claim 1, wherein in order to protect the aluminum fins after pickling it utilizes a bath consisting of 5 to 15 percent stearin, 2 percent ammonium bromide and 83 to 93 percent technical alcohol into which the pickled fins are maintained during 30 seconds at 30° to 35° C., in order to realize a protective film.

5. Method, according to claim 1, wherein the cooling pipes are covered by usual thermical methods with a layer of easily melting alloy at least 0.04 mm. thick, consisting of 46 percent tin, 15 percent zinc, 15 percent cadmium, 24 percent lead, or with two successive brazing alloy layers, the former consisting of a usual alloy containing 40 percent tin and 60 percent lead and the latter consisting of an easily melting alloy with the following percent composition: 51 percent tin, 16.2 percent zinc, 16.2 cadmium, 16.6 percent lead, or with only one alloy layer consisting of 40 percent tin and 60 percent lead.

6. Method according to claim 1, wherein, for protecting the cooling pipes after covering them with a brazing alloy or alloys, the pipes are immersed into a bath consisting of: 20 percent stearin, 40 percent paraffin oil, 18 percent paraffin, 2 percent ammonium bromide and 20 percent gas-oil when the fins are of copper, brass or steel, and, if the fins are of aluminum, into a bath consisting of 5 to 15 percent stearin, 2 percent ammonium bromide and 83 to 93 percent technical alcohol, in which baths the pipes are maintained during 30 seconds at 30 to 35° C., in order to realize the protective film.

* * * * *